US006775740B1

(12) United States Patent
Nishiyama (10) Patent No.: US 6,775,740 B1
(45) Date of Patent: Aug. 10, 2004

(54) PROCESSOR HAVING A SELECTOR CIRCUIT FOR SELECTING AN OUTPUT SIGNAL FROM A HIT/MISS JUDGEMENT CIRCUIT AND DATA FROM A REGISTER FILE

(75) Inventor: Hiroyasu Nishiyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 440 days.

(21) Appl. No.: 09/645,406

(22) Filed: Aug. 25, 2000

(30) Foreign Application Priority Data

Jun. 28, 2000 (JP) ........................................ 2000-200088

(51) Int. Cl.[7] .......................... G06F 12/08; G06F 9/302
(52) U.S. Cl. ........................ 711/118; 712/225; 712/226; 712/244
(58) Field of Search .................. 711/118; 712/225–226, 712/244

(56) References Cited

U.S. PATENT DOCUMENTS

| | | | | |
|---|---|---|---|---|
| 5,201,056 A | * | 4/1993 | Daniel et al. ................. | 712/41 |
| 5,321,823 A | * | 6/1994 | Grundmann ................ | 712/226 |
| 5,774,685 A | * | 6/1998 | Dubey ........................ | 712/205 |
| 5,875,294 A | * | 2/1999 | Roth et al. .................... | 714/35 |
| 6,226,738 B1 | * | 5/2001 | Dowling ..................... | 712/225 |

OTHER PUBLICATIONS

Mano, *Computer Sytem Architecture*, 1982, pp. 236–241.*
"Architecture and Programming Manual, Intel", Pentium Family Developer's Manual, Last Volume, pp. 26–1 to 26–11, No Translation.
Power PC 604 User's Guide, IBM Microelectronics and Motorola, 1994, pp. 9–1 to 9–11.
M. Horowitz et al, "Informing Memory Operations: Providing Memory Performance Feedback in Modern Processors", Proceedings of the 23rd Annual International Symposium on Computer Architecture, 1996, pp. 260–270.

* cited by examiner

*Primary Examiner*—Denise Tran
(74) *Attorney, Agent, or Firm*—Mattingly, Stanger & Malur, P.C.

(57) ABSTRACT

A processor for carrying out an arithmetic operation in accordance with a program using data stored in a memory connected to the outside includes: a register file having at least one register for storing therein data which is used in the arithmetic operation or data of the result of the arithmetic operation; a cache memory holding therein a copy of a part of the data which is stored in the memory; a hit/miss judgement circuit judging whether or not data which is to be accessed in accordance with an access instruction is present in the cache memory; and an arithmetic operation unit receiving as its input a judgement result obtained from the hit/miss judgement circuit and a data which has been read out from the register file to carry out a predetermined arithmetic operation.

2 Claims, 8 Drawing Sheets

FIG. 3 r0/r1 = LD.L2miss.accum A[i]
 701 702      703      704

Switch :
THREAD SWITCHING CODE

```
                    ┌800            801
        mc=0                         │
      ┌─ ─ ─ ─ ─ ─ ─ ─ ─ ─ ─ ─ ─ ─ ─ ┐
      │ L0:                          │
      │   r1/mc = LD.L2miss.accum A [i] │
      │   r2/mc = LD.L2miss.accum B [i] │
      │   r1 = add r1,r2             │
      │   C[i] = ST r1               │
      │   If (mc > β ) goto L1 ──802 │
      │   i = add i,1                │
      │   if (i < N) goto L0         │
      └─ ─ ─ ─ ─ ─ ─ ─ ─ ─ ─ ─ ─ ─ ─ ┘
                     ⋮

L1:
        r1 = LD A [i]
        r2 = LD A [i+1]
      L2:
        r3 = LD A [i+2]
        r4 = LD B [i]
        r1 = add r4,r1
        C[i] = ST r1
        r1 = r2
        r2 = r3
        i = add i,1
        if (i < N) goto L2
```

PROCESSOR HAVING A SELECTOR CIRCUIT FOR SELECTING AN OUTPUT SIGNAL FROM A HIT/MISS JUDGEMENT CIRCUIT AND DATA FROM A REGISTER FILE

BACKGROUND OF THE INVENTION

The present invention relates in general to a microprocessor and a compiler for use in the same. More particularly, the present invention relates to a microprocessor having a function of changing dynamically the execution of instruction in accordance with the operation characteristics of accessing or referencing a memory in execution of a program, and a method of compiling programs.

The performance of the recent microprocessors has been greatly enhanced by the improvements in the parallel computation (parallelism) of the instruction levels, the improvements in the operating frequency, and the like. On the other hand, the performance of a main storage has not been enhanced so much. For this reason, the main storage access cycle in the cache miss becomes one of the main causes by which the performance of a program is lowered. In the general microprocessor, a cache memory operates transparently from an application program. In other words, it can not be judged from the application program whether or not the cache miss has occurred. However, as described above, the memory operation such as the cache miss exerts a great influence on the performance of executing the application program. Therefore, it is desirable to control finely the execution of the application program in accordance with the fine memory access operation in the execution.

As for the techniques wherein the number of times of cache miss or the like in the memory access can be accessed or referenced from the application program, there is known a performance monitoring function. For example, the function of counting up the number of times of cache misses or the like on a special register to access this value is disclosed in an article of "ARCHITECTURE AND PROGRAMMING MANUAL, INTEL", Pentium Family Developer's Manual, the Last Volume. The same function is also disclosed in an article of "POWER PC 604 USER'S GUIDE, IBM MICROELECTRONICS AND MOTOROLA" for example. In these functions, a register for counting up the generation number of times of cache miss is defined as a special register such as a performance counter. In order to be aware of whether or not the cache miss has occurred with respect to the individual memory accesses, it is required that the contents of the performance counter are read out to a general purpose register before and after the issue of the memory access instruction to judge on the basis of the comparison whether or not the value has been changed. Thus, complicated processings are required.

The technique for coping with such a problem to refer to simply the individual operation states when accessing a memory with a low overhead, for example, is disclosed in article of M. Morowitz et al.: "INFORMING MEMORY OPERATIONS: PROVIDING MEMORY PERFORMANCE FEEDBACK IN MODERN PROCESSORS", In Proceeding of the 23-rd Annual International Symposium Computer Architecture, 1996. In this article, there is disclosed the technique wherein it is judged every memory access instruction whether or not the cache miss as one of the memory access operations has been generated, and if it is judged that the cache miss has occurred, then the branching is made to a handler code. According to the present article, in order that it may be monitored whether or not the cache miss has occurred when carrying out a certain memory access, the following three methods have been proposed.

(a) When a memory access causes a cache miss to be generated, a branching conditional code is set and the code is arranged with which after completion of the memory access, the conditional code is accessed to carry out conditional branching. In this method, for example, a flag exhibiting whether or not when carrying out a load instruction, a cache miss occurs is stored in the branching flag code area. In the next instruction, the branching flag code area is checked. Then, if it is judged that the cache miss has occurred, then a routine of executing a processing in the cache miss is called.

(b) When the memory access causes a cache hit, the next instruction of the memory access is made invalid. In this method, for example, the instruction of calling the routine of executing the processing in the cache miss is inserted into the position after the load instruction. If no cache miss is generated when executing the load instruction, then the execution of the next calling instruction is inhibited. On the other hand, if the cache miss has occurred when executing the load instruction, the calling instruction is executed, and then the routine of executing the processing in the cache miss is executed.

(c) When the memory access causes a cache miss to occur, the exception is generated so that the control is passed to an exceptional handler routine which has been specified by a special register. In this method, the addresses of the routine (the exceptional handler routine) which is to be executed when the cache miss has occurred are previously set in an MHAR (Miss Handler Address Register) as the special register. If the cache miss has occurred when executing the load instruction, then the exceptional handler routine in the addresses which were set in the MHAR is called.

In those methods, in the routine which is executed in the cache miss, for example, the processing such as the processing of adding the value of a counter for counting the number of times of cache miss is executed.

SUMMARY OF THE INVENTION

Of the techniques which have been described in the prior art, in the methods (a) and (c), when the cache miss has occurred, the branching occurs. In general, since the microprocessor carries out the branching estimation and executes estimatively one instruction execution path for which it has been estimated that its frequency is high, the branching instruction in accordance with which the path is executed for which it has been estimated that its frequency is low causes the penalty to occur in execution of the instruction. On the other hand, in the above-mentioned method (b), since it is decided on the basis of the hit/miss of the instruction directly before the subsequent instruction whether or not the subsequent instruction should be executed, there arises the problem that the complexity of the hardware/software is brought. In addition, in each of the above-mentioned methods, since the access to the memory is paired with the detection of its operation, the penalty will always occur due to the memory access. Therefore, for example, there arises the problem that whether or not the request of accessing a memory which was made previously has been completed can not be identified without accessing the memory.

In order to solve the above-mentioned problems associated with the prior art, a processor according to an aspect of the present invention comprises: a register file having at least one register for storing therein data which is used in an arithmetic operation or data of the result of the arithmetic operation; a cache memory for holding therein a copy of a part of the data which is stored in a memory; a hit/miss judgement circuit for judging whether or not data which is to be accessed in accordance with an access instruction is present in the cache memory; and an arithmetic operation unit receiving as its input a judgement result obtained from the hit/miss judgement circuit and a data which has been read out from the register file to carry out a predetermined arithmetic operation. The result of the arithmetic operation made by the arithmetic operation unit is stored as information exhibiting the access operation in the register within the register file. In the preferred aspect of the present invention, the processor has an access instruction followed by the processing of storing the result of the access operation in the register.

According to another aspect of the present invention, in a method of compiling programs for generating program codes which can be understood by a computer on the basis of the program which has been inputted thereto, the program which has been inputted is analyzed and on the basis of the analysis result, a part of the program having the possibility that a delay of processing may occur due to occurrence of cache miss is extracted. A memory access instruction which is contained in the extracted part of the program is converted into an access instruction in accordance with which the result of the operation of accessing the memory is acquired to generate a code for selecting a processing which is dynamically performed on the basis of the acquired result of the memory access operation.

BRIEF DESCRIPTION OF THE DRAWINGS

The above and other objects, features and advantages of the present invention will become apparent from the following description of the embodiments of the present invention with reference to the accompanying drawings, wherein.

DETAILED DESCRIPTION OF THE EMBODIMENTS

The embodiments of the present invention will hereinafter be described in detail with reference to the accompanying drawings.

Figure 1:
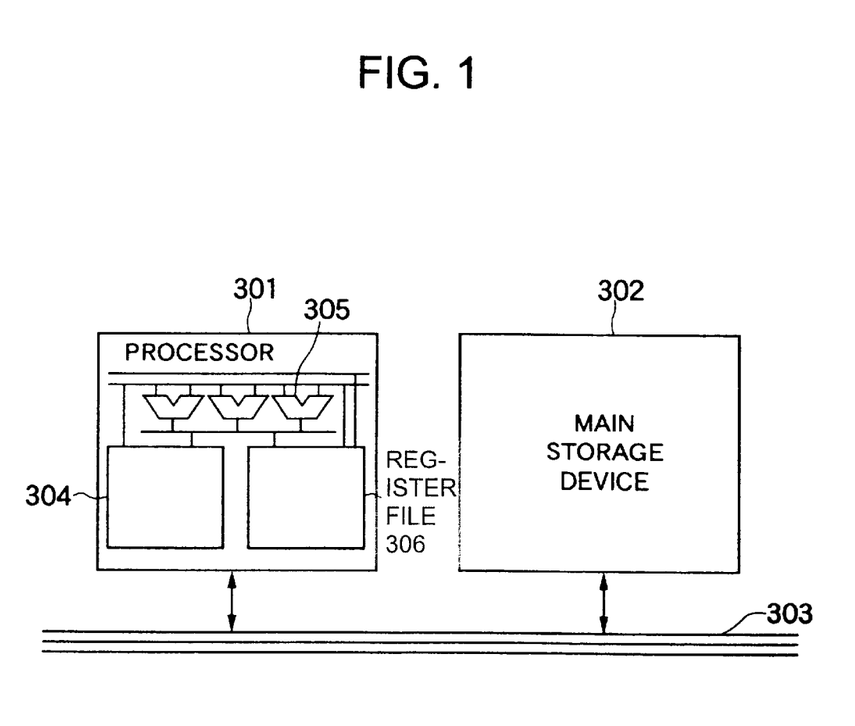
FIG. 1 is a block diagram showing an example of a simplified configuration of a computer system to which the present invention is applied.

FIG. 1 is a block diagram showing an example of a simplified configuration of a computer system to which the present invention is applied. In FIG. 1, a processor 301 and a main storage 302 are both electrically connected to a bus 303. The processor 301 accesses a data which is held in the main storage 302 through the bus 303. In this connection, while in general, in the computer system, in addition to a processor and a main storage, peripheral devices (I/O apparatuses) such as a keyboard, a display and a magnetic disk device, and/or a controller for controlling these peripheral devices, and the like are provided, these elements do not directly relate to the present invention, and hence the illustration thereof is omitted here for the sake of simplicity.

The processor 301 is configured in such a way as to include: a register file 306; a cache memory 304; arithmetic operation units 305; and the like. The processor 301, when accessing the data, judges first of all whether or not the corresponding data is present on the cache memory 304. If it has been judged by the processor 301 that the corresponding data is present on the cache memory 304, then the processor 301 accesses the data which is stored in the cache memory 304. On the other hand, if it has been judged by the processor 301 that the corresponding data is absent on the cache memory 304, then the processor 301 transfers the data from the main storage 302 to the cache memory 304 to access the data thus transferred thereto. The operation of accessing the data on the cache memory can be more speedily carried out than the operation of accessing the data on the main storage 302. For this reason, the data is preserved in the cache memory 304, whereby after the next time, the speed of the operation of accessing the same data will be increased. In this connection, while the lower cache memory such as a secondary cache memory may be provided between the main storage 302 and the processor 301 in some cases, this configuration is not the essential restriction to the realization of the present invention, and hence in the present embodiment, the description will hereinbelow be given on the assumption as described above for the sake of simplicity.

Figure 2:
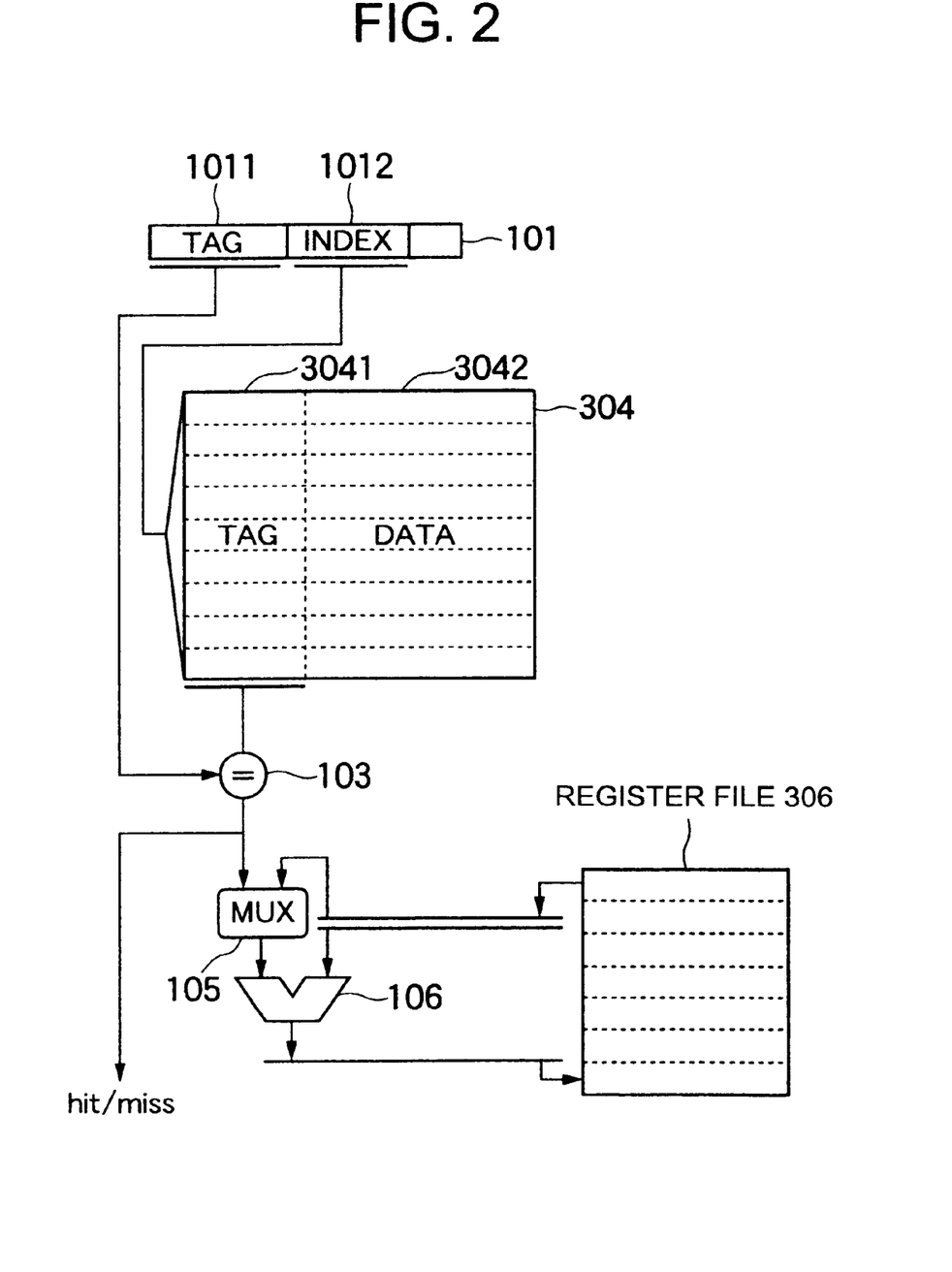
FIG. 2 is a partial block diagram showing an example of a mechanism part which a processor includes in order to store the result of the operation of accessing a cache memory in a general purpose register.

FIG. 2 is a partial block diagram showing an example of a mechanism part which a processor includes in order to store the result of the operation of accessing a cache memory in a general purpose register. Address on the main storage 302 of the data which will be accessed by the processor in the data access are set in an access object address 101. The address of the main storage 302 includes a tag part 1011 and an index part 1012. The cache memory 304 has a plurality of entries which are specified on the basis of the index part 1012. Each of the entries includes a tag area 3041 in which the value of the tag part of the address is stored, and a data area 3042 in which the data is stored. The data in the area of the main storage 302, which is specified on the basis of the index to which the associated one of the entries is made correspond, and the tag which is set in the corresponding tag area 3041 (FIG. 10) is stored in the data area 3042 (FIG. 10) of each of the entries. A comparator 103 receives as its input a value of the tag part 1011 of the access object address 101 and a value which is set in the tag area 3041 of the entry of the cache memory 304 which has been selected on the basis of the index part 1012. If both of the values coincide with each other, then the comparator 103 outputs a signal exhibiting the cache hit, while if both of the values are different from each other, then the comparator 103 outputs a signal exhibiting cache miss. In the processor 301, it is decided whether the data of the cache memory 304 is accessed on the basis of the output signal of the comparator 103, or the data is transferred from the main storage 302 to the cache memory 304, thereby carrying out the operation of accessing the data. Since as for the technique for realizing that procedure, the technique which has been conventionally well known can be adopted, the description thereof is omitted here for the sake of simplicity.

In the present embodiment, the output signal of the comparator 103 is used to decide the destination of the data access, and in addition thereto, is supplied to one input terminal of a selector 105. To the other input terminal of the selector 105 is inputted the value which has been read out from the register file 306. Then, the selector 105 switches those input signals over to each other in accordance with the instruction to be executed to output selectively the associated one of those input signals. In other words, when having executed the memory access instruction followed by the processing of preserving the result of the operation of accessing the cache memory on the general purpose register as will be described later, the output signal of the comparator 103 is selected to be inputted to an arithmetic operation unit 106.

The arithmetic operation unit 106 carries out an arithmetic operation with respect to the value which has been outputted from the selector 105 and the value which has been read out from the register file 306. The result of the arithmetic operation made by the arithmetic operation unit 106 is stored in the register within the register file 306.

Figure 3:
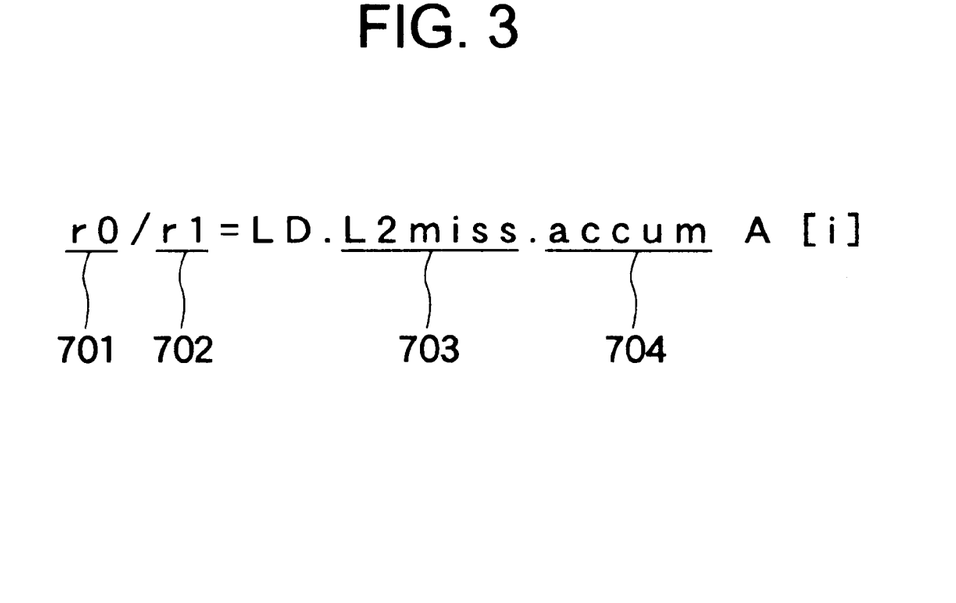
FIG. 3 is a diagram useful in explaining an example of a description of a load instruction.

FIG. 3 is a diagram useful in explaining a description example of a load instruction as one example of an access instruction which is applied to the present embodiment. In the figure, reference numeral 701 exhibits a register for storing therein the access result, i.e., the accessed data, and reference numeral 702 exhibits a register for storing therein the result of the operation of accessing the memory. Also, reference numeral 703 exhibits a method of monitoring the operation of accessing the memory. More specifically, it is shown by reference numeral 703 that the monitoring method, for example, is to monitor the cache miss of the primary cache (the L1 cache miss), or to monitor the cache miss of the secondary cache (the L2 cache miss). In addition, reference numeral 704 exhibits a method of recording the result of the operation of accessing the memory. That is, the recording method of the substitution which is made for the specified register, the accumulation which is made for the specified register, or the like is specified.

After having executed the instruction shown in the figure, the value of the arrangement A[i] is loaded into (stored in) a register "r0". As the operation of accessing the memory, L2 cache miss in execution of this load instruction is monitored and the result thereof is accumulated in a register "r1". More specifically, the value stored in the register "r1" is read out from the register file 306 to be supplied to the arithmetic operation unit 106. In addition, when executing this instruction, the selector 105 inputs the output signal from the comparator 103 to the arithmetic operation unit 106. When the data which is accessed in accordance with the load instruction is absent in the cache memory 304 (in this case, we think that the cache memory 304 is the L2 cache memory), the value "1" exhibiting cache miss and the value stored in the register "r1" are added to each other in the arithmetic operation unit 106. The accumulated value of the cache miss which has been obtained as the result of this arithmetic operation is written to the register "r1" within the register file 306.

In this connection, description has been given with respect to the case where the accumulated value of cache miss is acquired. When acquiring information relating to presence or absence of cache miss, "0" may be given as an output value from the register file which is inputted to the arithmetic operation unit 106, or the output value of the comparator 103 may be directly written to the register file.

Figure 4:
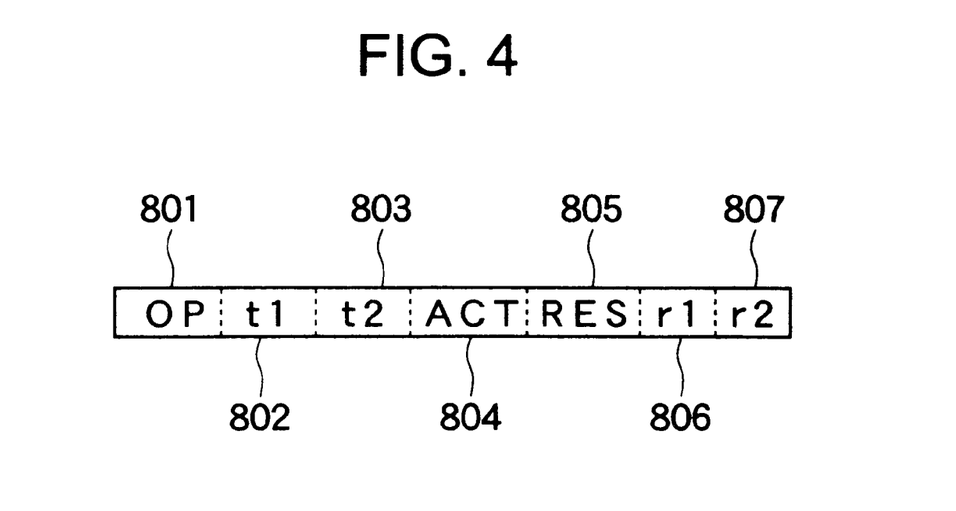
FIG. 4 is a diagram useful in explaining an example of an instruction format of a load instruction.

FIG. 4 is a diagram useful in explaining one example of an instruction format of the load instruction which is exemplified in FIG. 3. The load instruction in the present embodiment includes: an instruction code 801 meaning the load instruction; a code 802 specifying a register in which an access result is stored; a code 803 specifying a register in which the result of the operation of accessing the memory is stored; a code 804 exhibiting an operation of the monitoring object; a code 805 exhibiting a method of storing the result of the access operation; and codes 806 and 807 specifying a register for holding a base value for use in the arithmetic operation for the address and the register for holding an offset value for use in the arithmetic operation for the address, respectively.

While in the present embodiment, as the memory access instruction, the load instruction is described as an example, it is possible to prepare the same instruction for the instructions such as store instruction, and the data prefetch instruction as well. In addition, except for the function of loading actually the data of the functions of executing the instructions which have been described here, it is also possible to provide the instruction in accordance with which only the check of the operation of accessing the memory such as the cache miss is carried out. If such an instruction is employed, then it is possible to inspect whether or not when carrying out the operation of accessing the memory, the cache miss or the like occurs without carrying out the operation of accessing the memory such as load/store. The instruction in accordance with which only the check of the operation of accessing the memory is carried out is utilized, whereby for example, it is possible to identify whether or not the operation of accessing the memory which was started to be carried out previously has been completed.

Figure 5:
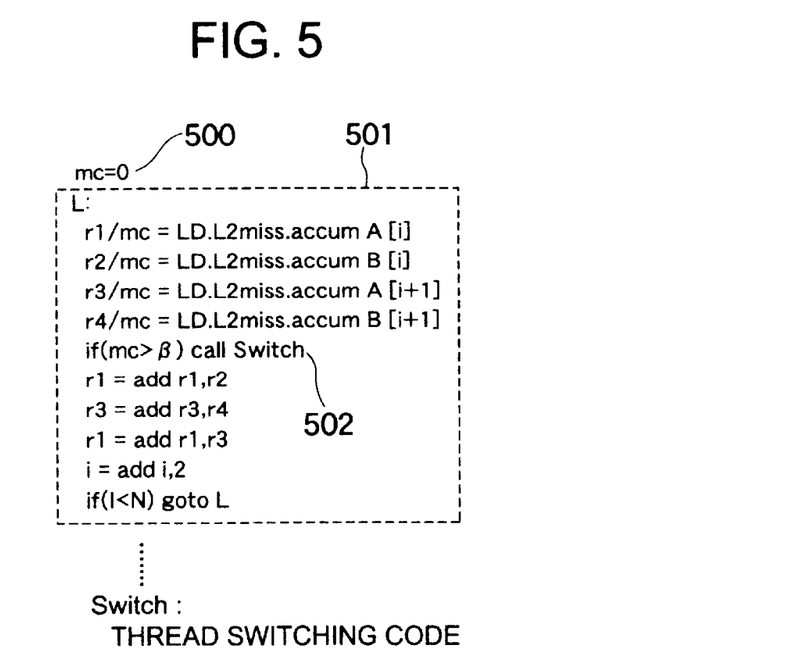
FIG. 5 is a diagram showing a program list showing one example of a compiler generation code of a program to which a function of acquiring the result of the memory access operation is applied.

FIG. 5 is a program list showing one example of a compiler generating code of the program to which a function of acquiring the result of the above-mentioned operation of accessing the memory is applied. The program which is exemplified in FIG. 5 is a program for implementing a processing in which a thread is switched when the number of times of cache miss has exceeded a predetermined value, and the memory access latency is concealed. Now, the thread is defined as an execution unit for program which is executed independently. In the case where when a certain thread is being executed, the event, such as cache miss, for which a long cycle is required until the completion thereof occurs, the thread being executed is switched over to another thread, whereby the throughput of executing the program can be enhanced in terms of the overall system.

Figure 6:
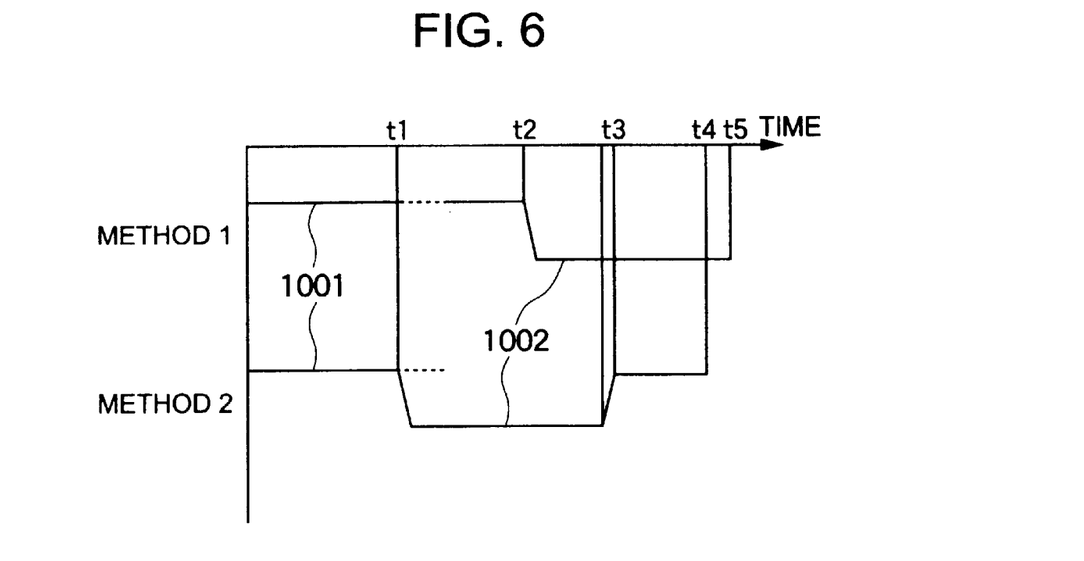
FIG. 6 is a time chart showing the situation of improving the throughput by the switching of a thread.

FIG. 6 is a time chart showing the situation of the enhancement of the throughput which is provided by switching the thread. In FIG. 6, the case (the method 1) where two threads are executed without switching the thread being executed is compared with the case (the method 1) where the thread is switched in accordance with an occurrence of cache miss. In this example, it is assumed that when a first thread is being executed, the cache miss occurs at a time point t1.

In the first method, after it is waited for that the data has been loaded from the main storage 302 without switching the thread as it is, the first thread is continued to be executed. Then, at a time point t3 when the execution of the first thread has been completed, the first thread is switched over to the second thread. The execution of the second thread is completed at a time point t5.

On the other hand, in the second method 2, at a time point when a cache miss has occurred, a thread to be executed is switched from the first thread over to the second thread. At the time when the execution of the second thread has been completed (t2), the second thread is switched over to the first thread so that the first thread is executed again and the continuing processing is executed. The execution of the first thread is completed at a time point t4. Since in the second method 2, at the time point when the cache miss has occurred, the first thread is switched in execution over to the second thread, the cache miss cycle is concealed. For this reason, it is understood that the total execution time of the two threads in the method 2 is shortened as compared with the first method 1.

Referring back to FIG. 5 again, in the program which is exemplified in FIG. 5, first of all, in accordance with an instruction 500, the value "0" is set in a register mc which becomes a counter. In a loop 501, a load instruction and an arithmetic operation employing data which has been loaded in accordance with the load instruction are executed. As the load instruction, the load instruction is employed in accordance with which the result of the above-mentioned operation of accessing the memory is acquired. As a result, in execution of the load instruction, information relating to the number of times of cache miss is accumulated in the register mc. At the time when the number of times of cache miss has exceeded a fixed value (it is assumed to be β in this case), the thread switching code is called in accordance with the execution of an instruction 502 to switch the execution thread over to another thread.

Figure 7:
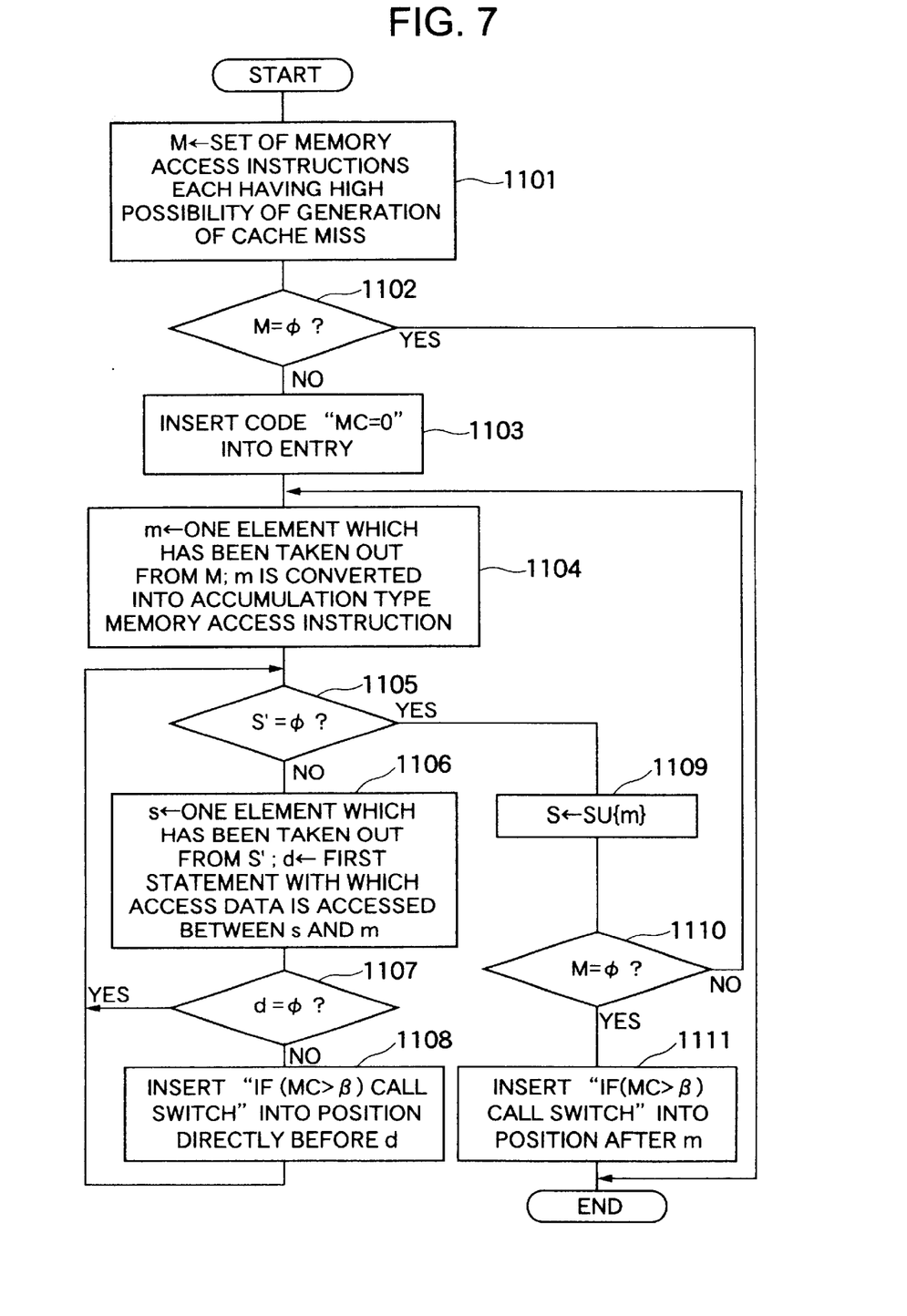
FIG. 7 is a flow chart showing an algorithm for generating a thread switching code.

FIG. 7 is a flow chart showing an algorithm for generating a thread switching code. In the generation of the thread switching code, first of all, a set of the memory access instructions in each of which the possibility is high that the cache miss may occur are acquired in a variable M. The processing of acquiring the memory access instructions each having the high possibility of generation of cache miss can be realized on the basis of an access pattern analysis in the conventionally well known compiler optimization or the memory access profile (Step 1101). Next, it is judged whether or not the variable M is a null set (ϕ) (Step 1102). If it has been judged that the variable M is the null set (M=ϕ), then the processing is completed. On the other hand, it has been judged that the variable M is not the null set, then an initialization code "mc=ϕ" of the counter is inserted into the entry of the optimization object code and then a variable S in which the converted memory access set is held is initialized into the null set (Step 1103).

Next, one element, for a variable m, is taken out from the variable M and then the one element thus taken out for the variable m is converted into an accumulation type memory access instruction with monitoring. Thereafter, a variable S is copied to a variable S' (Step 1104). Then, it is confirmed whether or not the variable S' is the null set (Step 1105). If it has been judged that the variable S' is not the null set, then one element is taken out from the variable S' to be held in a variable s. Then, the first statement with which the data which is being accessed by the element of the variable m is accessed between the variables s and m is acquired in a variable d (Step 1106). Subsequently, it is judged whether or not the statement corresponding to the variable d is present (Step 1107). If it has been judged that the statement corresponding to the variable d is absent, then the processing is returned back to Step 1105 in which the next statement is in turn processed. On the other hand, if it has been judged that the statement corresponding to the variable d is present, then when the data which has been read out from the memory with the statement indicated by the variable m causes the cache miss to occur, the waiting for the access to the data will occur in the statement corresponding to the variable d. Then, when the value of the counter mc is equal to or larger than a fixed value (β), the statement "if (mc>β) call Switch" with which the thread switch code is called is inserted into the position directly before the statement which is held in the variable d. Thereafter, the processing is returned back to Step 1105 to execute the next statement (Step 1108). When "S'=ϕ" is established as a result of the judgement in Step 1105 and hence any of the statements to be processed is absent, the statement m is added to the set S (Step 1109). Then, it is confirmed whether or not some of the elements of the memory access set M to be processed are still present (Step 1110). If it has been judged that some of the elements as the object of the processing are present, then the processing is returned back to Step 1104 to continue further the processing. On the other hand, if it has been judged that any of the elements of the memory access set M to be processed is absent, the statement "if (mc>β) call Switch" with which the thread switch code is called is inserted into the position after the final memory access statement m to complete the processing (Step 1111).

Figure 8:
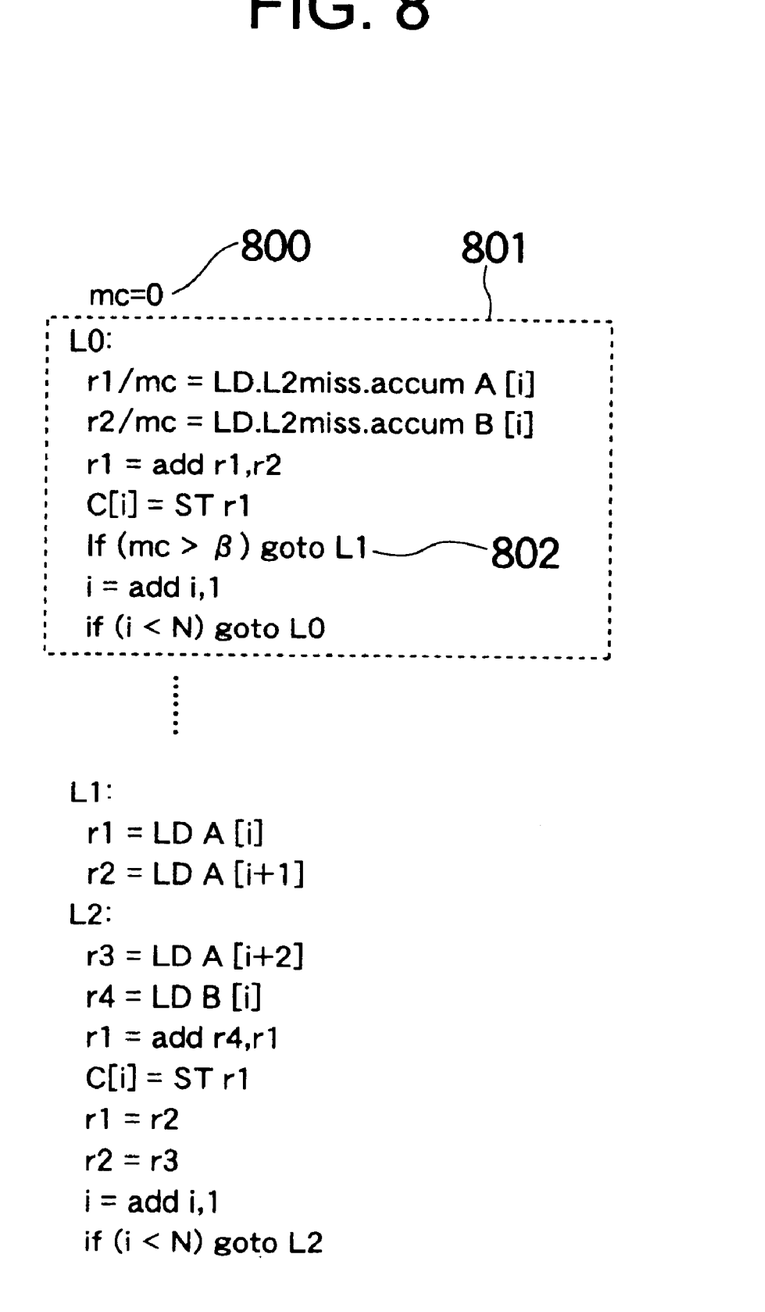
FIG. 8 is a diagram of a program list showing one example of a program which is used to avoid the lowering in performance due to address contention among a plurality of prefetches.

FIG. 8 is a program list showing one example of a program for avoiding the lowering of the performance due to the address contention between a plurality of prefetches by utilizing the memory access instruction in the present embodiment. The capacity of the cache memory is necessarily limited. For this reason, in the cache memory which is of a direct map type or of a set associative type, a part of the addresses of the access object is used as the index, and the entry of the cache memory is determined on the basis of that index. Thus, the entry of the same cache memory is held in common between a plurality of addresses. If the accesses to a plurality of arrangements in the loop will be to access the same cache line, then the data which has been loaded into the cache memory by the access to one arrangement is driven out by the access to another arrangement so that the performance of executing the program will be greatly lowered. Such phenomenon is called the cache slashing.

In the program shown in FIG. 8, first of all, in accordance with an instruction 800, the contents of the counter mc are initialized to zero. In a loop 801 which is specified with a label L0, an access to the arrangements is carried out while counting up the number of times of occurrence of cache miss. When the many values which are counted up by the counter mc is present, there is the possibility that the slashing may be generated. When in this program, such a state is detected, the processing branches to a code L1 with which the generation of the slashing is avoided by the processing which is executed in accordance with an instruction 802 (the slashing avoidance code). In the code for the slashing avoidance, the addresses of the arrangements which are to be accessed in the loop are shifted, whereby the contention of the addresses is avoided. In the program which is exemplified in FIG. 8, in order to avoid the generation of the slashing, the suffixes of the arrangement access on one side are shifted by two.

Figure 9:
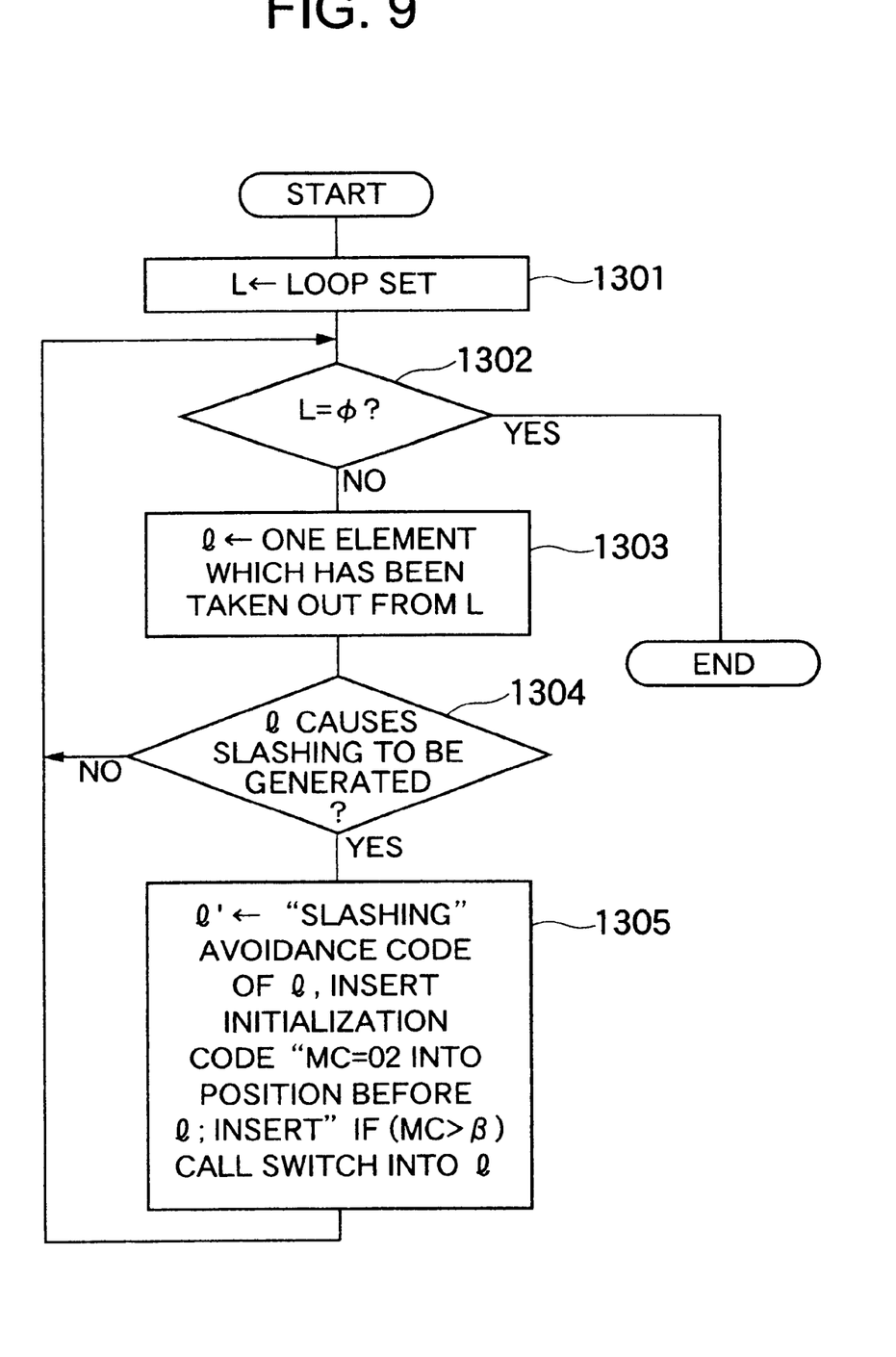
FIG. 9 is a flow chart showing an algorithm for generating a code with which a thrashing is avoided.

FIG. 9 is a flow chart showing the algorithm for generating the slashing avoidance code. In the generation of the slashing avoidance code, first of all, the loop set is acquired in a variable L (Step 1301). Next, it is confirmed whether or not the loop set which has been acquired in the variable L is a null set (Step 1302). If it has been confirmed that the loop set which has been acquired in the variable L is the null set, then it is judged that any of the loops to be processed is absent. Therefore, in this case, the processing of generating the slashing avoidance code is completed. On the other hand, if it has been confirmed that the loop set which has been acquired in the variable L is not the null set, one element is taken out from the variable L to be stored in a variable l (Step 1303). Next, it is confirmed whether or not there is the possibility that the access which is carried out in the loop l may cause the slashing to be generated. For the processing of judging whether or not there is the possibility that the access which is carried out in the loop may cause the slashing to be generated, it is possible to utilize the arrangement contention analysis processing, the memory access profile technique or the like which is all the well known techniques (Step 1304). If it can be ensured as a result of the judgement in step 1304 that the slashing is not generated at all, then the processing is returned back to the processing in step 1302 to continue the processing for the next loop. On the other hand, if it has been judged as a result of the judgement in step 1304 that there is the possibility that the slashing may be generated, then the slashing avoidance code of l is generated in l'. In order to avoid the cache contention, it is possible to apply the well known optimization processing to the generation of the slashing avoidance code. Then, the counter initialization code "mc=0" is inserted into the position before the loop l into which the slashing detection code "if (mc>β) go to L1" (in this case, "L1" is the label of the slashing avoidance code l') is in turn inserted. As a result, if it has been detected in execution of the loop l that the slashing has been generated, then the control is passed to the slashing avoidance code l' so that the generation of the slashing can be avoided (Step 1305).

After completion of the processings described above, the processing is returned back to the processing in step 1302 again and then the same processing will be executed for the next loop.

Next, the effects which are obtained when applying of the program which is exemplified in FIG. 8 will hereinbelow be discussed. Now, it is assumed that in the case where the number of cycles of the access to the main storage is 100 and the data on the cache block is used with loop repetition of 4 times so that the prefetch is ideally carried out, the cycle of the access to the main storage is perfectly concealed. In addition, it is assumed that the loop execution cycle per time in the ideal state is II. Assuming the case where the data for the arrangement A is driven out from the cache memory by the prefetch for the arrangement B, the cache miss will occur once every four times in the access to the arrangement A. Therefore, the performance of execution of the loop is increased up to "II+25". In the code shown in FIG. 8, the contention is generated with the repetition of the number of first several times. However, this contention is detected in accordance with the instruction 802 and then the loop is executed in which the access addresses are adjusted. As a result, in the repetition processing from now on, the generation of the slashing is avoided so that the instructions are executed substantially in the ideal state.

According to the present embodiment as has been described above, the processings such as the dynamical switching of the threads, and the avoidance of the generation of the cache slashing are dynamically selected in execution and hence the performance of executing the program can be enhanced.

Figure 10:
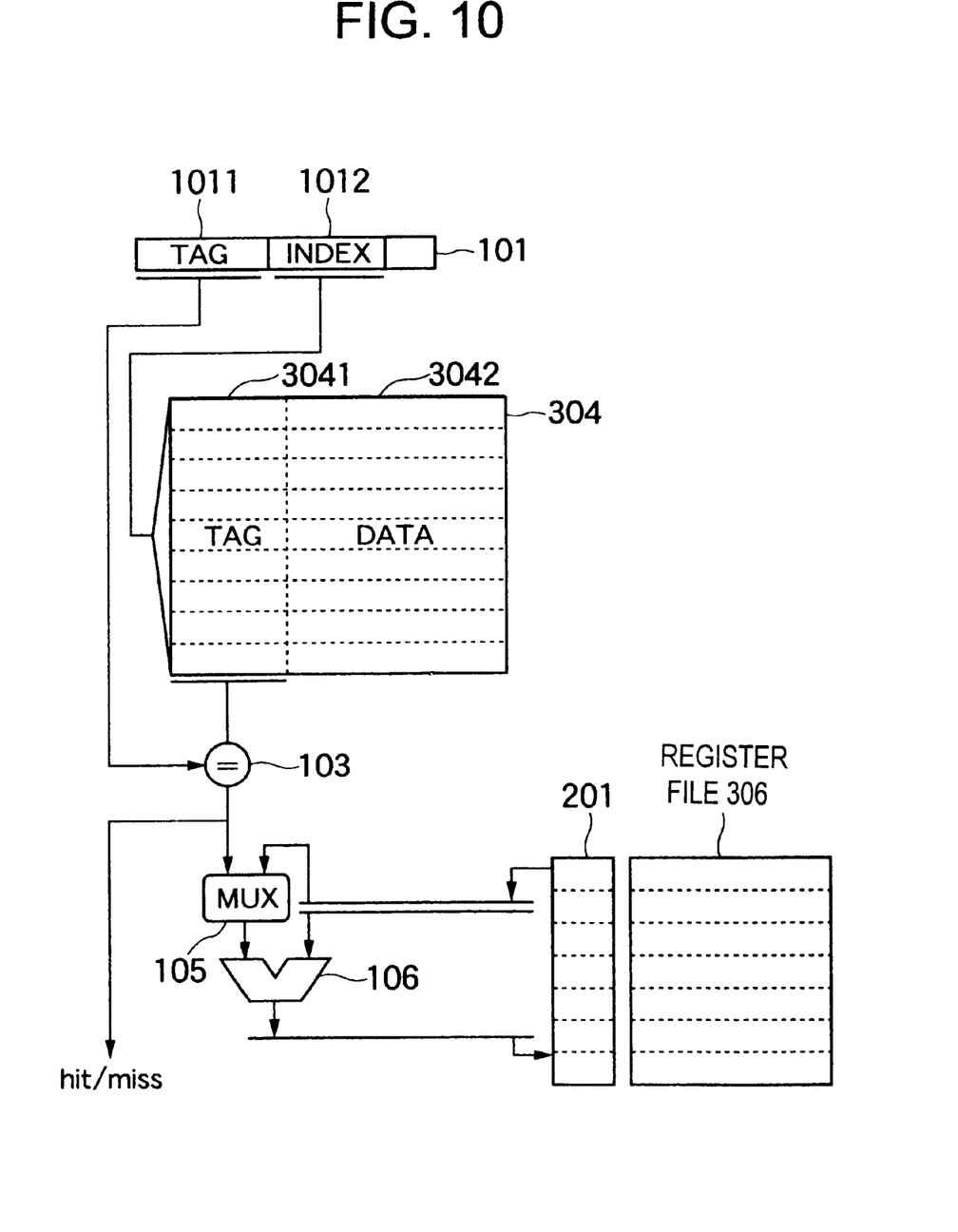
FIG. 10 is a partial block diagram showing an example of a configuration in another embodiment of a mechanism part which a processor includes in order to acquire the result of the operation of accessing a cache memory.

FIG. 10 is a partial block diagram showing an example of a configuration of another embodiment of a mechanism part which the processor includes in order to acquire the result of the operation of accessing the cache memory. A circuit shown in FIG. 10 has basically the same configuration as that of the circuit shown in FIG. 2. Therefore, parts having the same functions as those in FIG. 2 are illustrated in such a way as to be designated with the same reference numerals.

The circuit of the present embodiment is different from the circuit shown in FIG. 2 in that an additional field 201 is provided in the register file 306. In the present embodiment, when acquiring the result of the operation of accessing the cache memory, the value which is held in the additional field 201 is inputted to the arithmetic operation unit 106 and also the output signal of the arithmetic operation unit 106 is inputted to the additional field 201. In this case, in order to access the result of the access operation which has been inputted to the additional field 201, for example, as the instruction issued from the processor, the dedicated instruction may be provided in accordance with which the data in the additional field 201 is accessed, or as a part of the access instruction, the access instruction in accordance with which the additional field 201 can be specified may be provided in the destination of the access.

In such a manner, in the case where the procedure is adopted in which the result of the operation of accessing the memory is stored in the additional field 201 of the register file 306, in the access instruction or the like, the field which is used to specify the register in which the result of the operation of accessing the memory is stored (e.g., the field 803 in the instruction format shown in FIG. 4) becomes unnecessary. Therefore, the circuit configuration in the present embodiment is effective in the case where there is a limit to the instruction field length of the processor.

Above, while the present invention has been concretely described with reference to the embodiments thereof, it is to be understood that this description is not intended to be construed in a limiting sense. That is, the present invention is not restricted to the above-mentioned embodiments, and hence the present invention may contain the various changes and modifications within the scope of the purport which is described in the appended claims.

What is claimed is:

1. A processor for carrying out an arithmetic operation in accordance with a program using data which are stored in a memory connected externally, said processor comprising:

a register file having at least one register, which stores therein data used in the arithmetic operation or data of a result of the arithmetic operation;

a cache memory holding therein a copy of a part of the data stored in said memory;

a hit/miss judgement circuit which judges whether or not a data which is to be accessed in accordance with a first access instruction is present in said cache memory; and an arithmetic operation unit which receives as its input a judgement result obtained from said hit/miss judgement circuit and a data which has been read out from said register file to carry out a predetermined arithmetic operation with respect to said received data, wherein the result of the arithmetic operation performed by said arithmetic operation unit is stored as information exhibiting an access operation in the register within said register file;

wherein said processor has another access instruction in accordance with which a data which is stored in said memory is accessed, said another access instruction instructing to store a result relating to whether or not the data which is accessed in accordance with said another access instruction is present in said cache memory, in the register in said register file;

wherein said first access instruction contains a designation of a register in which said result of the arithmetic operation is to be stored; and a selector circuit which receives as its input an output signal from said hit/miss judgement circuit and the data which has been read out from said register file to select the output signal from said hit/miss judgement circuit in execution of said first access instruction to supply the output signal thus selected to said arithmetic operation unit.

2. The processor according to claim 1, wherein said at least one register is a general purpose register.

* * * * *